(12) United States Patent
Jindal

(10) Patent No.: US 11,974,131 B2
(45) Date of Patent: Apr. 30, 2024

(54) SYSTEMS AND METHODS FOR SEAMLESS CROSS-APPLICATION AUTHENTICATION

(71) Applicant: Verizon Patent and Licensing Inc., Basking Ridge, NJ (US)

(72) Inventor: Ravi Jindal, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 83 days.

(21) Appl. No.: 17/662,360

(22) Filed: May 6, 2022

(65) Prior Publication Data
US 2023/0362643 A1 Nov. 9, 2023

(51) Int. Cl.
| | |
|---|---|
| *H04L 29/06* | (2006.01) |
| *H04L 9/32* | (2006.01) |
| *H04W 12/06* | (2021.01) |
| *H04W 12/069* | (2021.01) |
| *H04W 12/086* | (2021.01) |
| *H04W 12/71* | (2021.01) |
| *H04W 16/26* | (2009.01) |

(52) U.S. Cl.
CPC ......... *H04W 12/069* (2021.01); *H04L 9/3213* (2013.01); *H04W 12/086* (2021.01); *H04W 12/71* (2021.01)

(58) Field of Classification Search
CPC . H04W 12/069; H04W 12/086; H04W 12/71; H04L 9/3213
See application file for complete search history.

(56) References Cited

U.S. PATENT DOCUMENTS

| | | | |
|---|---|---|---|
| 9,648,652 B2* | 5/2017 | Granbery | H04W 12/50 |
| 10,083,282 B2* | 9/2018 | Rangaraj | H04L 63/0428 |
| 2006/0015358 A1* | 1/2006 | Chua | G06Q 20/40 |
| | | | 705/44 |
| 2009/0158414 A1* | 6/2009 | Chaudhry | H04L 9/3273 |
| | | | 726/10 |
| 2017/0139659 A1* | 5/2017 | Spriggs | G06F 9/451 |
| 2017/0155640 A1* | 6/2017 | Rykowski | H04L 63/0823 |
| 2019/0104190 A1* | 4/2019 | Justin | H04L 67/55 |
| 2019/0313246 A1* | 10/2019 | Nix | H04W 12/30 |

(Continued)

OTHER PUBLICATIONS

Android Developers, "Android Keystore System," https://developer.android.com/training/articles/keystore (Apr. 22, 2022).

(Continued)

*Primary Examiner* — Mohammad A Siddiqi

(57) ABSTRACT

A system described herein may receive an authentication request from a User Equipment ("UE"). The authentication request may include a particular identifier, such as an application group identifier. The system may determine whether a token is available (e.g., has been previously generated) for the UE and the particular identifier. If such token is not available, the system may initiate an authentication procedure that includes receiving input from the UE, and may generate the token, indicating that the authentication procedure has been completed. If the token is available, then the system may forgo initiating the authentication procedure. The system may output the token, such that a service provider system authenticates the UE based on the generated token and provides services to the UE based on authenticating the UE.

20 Claims, 9 Drawing Sheets

(56) References Cited

U.S. PATENT DOCUMENTS

2020/0359218 A1* 11/2020 Lee ................... H04M 15/50
2021/0314318 A1* 10/2021 Gupta ................ H04W 12/069
2021/0336944 A1* 10/2021 Brinckman ......... H04L 63/0815
2022/0239484 A1*  7/2022 Farrell ................ H04L 9/0891
2023/0379168 A1* 11/2023 Fu .................... H04W 88/04

OTHER PUBLICATIONS

Apple Developer Documentation, "Storing Keys in the Secure Enclave," https://developer.apple.com/documentation/security/certificate_key_and_trust_services/keys/storing_keys_in_the_secure_enclave (visited Apr. 25, 2022).

* cited by examiner

SYSTEMS AND METHODS FOR SEAMLESS CROSS-APPLICATION AUTHENTICATION

BACKGROUND

Application providers may provide services, information, etc. via applications installed at devices of users receiving such services, information, etc., (e.g., User Equipment ("UEs") such as mobile telephones, tablets, etc.). Application providers may require user and/or device authentication in order to prevent unauthorized access to such services, information, etc.

DETAILED DESCRIPTION OF EXAMPLE EMBODIMENTS

The following detailed description refers to the accompanying drawings. The same reference numbers in different drawings may identify the same or similar elements.

Embodiments described herein provide for seamless authentication mechanisms that may be used to authenticate a user and/or device across multiple different applications of a group of applications. For example, the different applications may be provided by the same entity or set of entities. Thus, the authentication of the user and/or device for one application may signify the authentication of the user and/or the device for other applications of the group (e.g., cross-application authentication). Cross-application authentication may provide for a more streamlined user experience, as cross-application authentication may provide for the authentication of the same user or device across different applications, thus removing the need for the user or device to perform a separate authentication procedure when accessing the different applications.

In accordance with some embodiments, the association of applications with a particular group may be performed without registering the applications with, or invoking cross-application authentication functions provided by, an operating system or application programming interface ("API") of UEs on which such applications are installed. In this manner, cross-application functionality for applications can be provided in a platform-agnostic manner (e.g., not dependent on particular functions provided by a given device operating system, native API, etc.). Further, embodiments discussed herein may provide for cross-application authentication of not just a particular user, but also a particular device based on network-based authentication mechanisms, therefore providing enhanced security.

Figure 1:
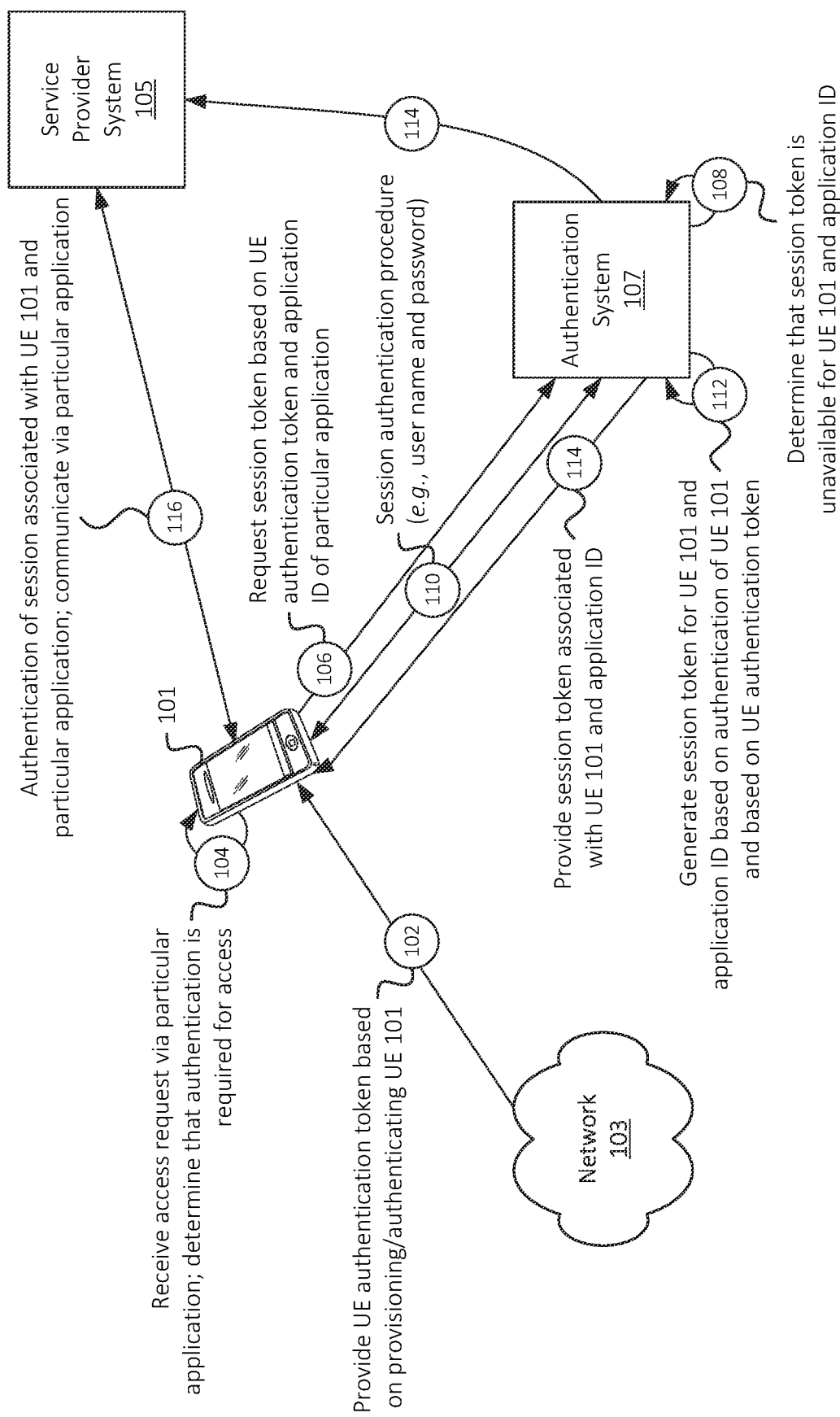
FIGS. 1 and 2 illustrate an example of generating and/or using a session token to authenticate a UE, in accordance with some embodiments.

As shown in FIG. 1, for example, UE 101 may receive (at 102) a UE authentication token from network 103. For example, network 103 may provide the UE authentication token to UE 101 as part of a provisioning procedure, an authentication procedure, an Over-the-Air ("OTA") update procedure, a radio access network ("RAN") attachment procedure, or other suitable procedure whereby network 103 verifies or authenticates the identify of UE 101. In some embodiments, the UE authentication token may include and/or may be based on an identifier of UE 101, such as a Mobile Directory Number ("MDN"), an International Mobile Subscriber Identity ("IMSI") value, an International Mobile Station Equipment Identity ("IMEI") value, a Subscription Permanent Identifier ("SUPI"), a Globally Unique Temporary Identifier ("GUTI"), or other type of identifier. In some embodiments, the UE authentication token may be generated by network 103 based on information stored in a SIM ("Subscriber Identification Module") card of UE 101, and/or the UE authentication token may be stored by UE 101 (e.g., in a SIM card or other suitable type of storage).

The UE authentication token may be signed by one or more devices or systems, or other entities associated with network 103. For example, the UE authentication token may be signed using a private key associated with network 103, which may be verifiable by using a public key associated with network 103 (e.g., where the private key and the public key are keys of a public-private key pair). In some embodiments, some other suitable mechanism may be used to verify that the UE authentication token was generated, provided, endorsed, signed, etc. by network 103 in addition to, or in lieu of, the use of a public-private key pair as discussed above. Generally, the UE authentication token, as signed by network 103, may indicate that UE 101 has been authenticated by network 103 as having access to network 103. Additionally, or alternatively, the UE authentication token and/or as being associated with a particular identifier (e.g., where the UE authentication token includes such identifier, and/or where such identifier is able to be derived, extracted, and/or otherwise ascertained based on the UE authentication token).

At some point, UE 101 may receive (at 104) a request to access a particular application, such as an application that is installed on, and/or is otherwise executing on, UE 101. The application may be a network application, such as an application that sends and/or receives traffic to and/or from service provider system 105. For example, the application may be a gaming application, an augmented reality application, a videoconferencing application, a messaging application, or some other suitable type of application. Service provider system 105 may be a network-accessible device or system (e.g., accessible via the Internet, via network 103, and/or some other network). In some embodiments, service provider system 105 may be implemented by a Multi-Access/Mobile Edge Computing ("MEC") device, referred to sometimes herein simply as a "MEC," that is deployed at a RAN to which UE 101 is connected. In some embodiments, service provider system 105 may include, may be implemented, may be communicatively coupled to, etc. an application server, a datacenter, a cloud-based system, a virtual machine, a containerized system, or one or more other types of devices or systems that securely communicate with UE 101 (e.g., to authenticate UE 101 and provide services associated with one or more applications to UE 101).

The request (at 104) to access the application may be, for example, based on a selection of a user of UE 101, such as when the user installs the application, opens or runs the application, clicks a "log in" button associated with the application, etc. In some embodiments, UE 101 may be configured to communicate with authentication system 107. For example, UE 101 may implement an API, software development kit ("SDK"), or other suitable mechanism by which UE 101 communicates with authentication system 107 in a manner described herein. In such instances, UE 101 may provide an API or other suitable communication pathway via which the application may request authentication of the user or of UE 101. Additionally, or alternatively, the application may be configured to communicate with authentication system 107 (e.g., may implement a suitable API, SDK, etc. via which the application communicates with authentication system 107).

In this example, the application and/or UE 101 may determine that authentication of the user and/or of UE 101 is required based on the access request associated with the application. For example, the user or UE 101 may not have previously been authenticated via the application, and/or a previous authentication session may have expired or may have otherwise been revoked.

Based on determining the requirement for authentication of the user and/or of UE 101, UE 101 may request (at 106) a session token from authentication system 107. As discussed below, the session token, once issued, may indicate that UE 101 and/or a user thereof have been authenticated by authentication system 107.

The request (at 106) for the session token may include an identifier of UE 101, such as an MDN, an IMSI value, an IMEI value, a SUPI, a GUTI, or other suitable identifier of UE 101. In some embodiments, the request may additionally or alternatively include an identifier of a user of UE 101 (e.g., a user initiating the access request), such as a user name or other suitable identifier.

In some embodiments, the request may include an identifier of the application, such as an application name, a cryptographic hash generated based on the application (e.g., based on an install package of the application, based on a name or other identifier of the application, etc.), or other suitable application identifier. Additionally, or alternatively, the request may include an identifier of service provider system 105 with which the application is associated, such as a redirect address, an Internet Protocol ("IP") address, a Uniform Resource Locator ("URL"), etc. of service provider system 105.

Based on receiving (at 106) the request for the session token associated with UE 101 and the particular application, authentication system 107 may determine (at 108) that a session token for UE 101 and the particular application is unavailable. For example, the session token may have never been previously created (e.g., this request may be the first request associated with UE 101 and the particular application that authentication system 107 has received), or a previously issued session token may have expired, been revoked, etc. Since the session token for UE 101 and the particular application is unavailable, authentication system 107 may initiate (at 110) a session authentication procedure with UE 101. While the authentication procedure as shown in FIG. 1 as one or more communications (at 110) between UE 101 and authentication system 107, the authentication procedure may be performed by, or in conjunction with, one or more other devices or systems. For example, authentication system 107 may notify service provider system 105 that UE 101 should be authenticated, and service provider system 105 may perform an authentication procedure with UE 101 (e.g., using a user name and password, biometric authentication techniques, or other suitable authentication techniques). Additionally, or alternatively, authentication system 107 may communicate with a Single-Sign On ("SSO") authentication system or other type of authentication system that is able to authenticate a user of UE 101, a user account associated with UE 101 and the particular application (and/or with service provider system 105), and/or some other suitable device or system. In instances where authentication system 107 communicates with one or more other devices or systems to authenticate UE 101 and/or the user thereof, authentication system 107 may receive a signed token from the one or more other devices or systems, which may securely indicate that the one or more other devices or systems have authenticated UE 101 and/or the user.

Based on the successful authentication of UE 101 and/or the user (at 110), authentication system 107 may generate (at 112) a session token for UE 101 and the particular application. The session token may be signed by authentication system 107 (e.g., using a private key associated with authentication system 107 and/or based on some other suitable signing mechanism).

In some embodiments, authentication system 107 may generate (at 112) the session token further based on validating the UE authentication token received (at 106) from UE 101. For example, as discussed above, authentication system 107 may use a public key associated with network 103 (and/or some other suitable mechanism) to verify that the UE authentication token was generated by network 103. As also discussed above, authentication system 107 may verify that UE 101 is the same UE associated with the UE authentication token. For example, authentication system 107 may extract, derive, etc. a UE identifier (e.g., MDN, IMSI, IMEI, etc.) from the UE authentication token. The UE identifier may, in some embodiments, be included as "plain text" associated with the UE authentication token, and/or may be encrypted in some way, embedded into the UE authentication token using an API associated with authentication system 107, and/or may otherwise be ascertainable from the UE authentication token. Authentication system 107 may compare the UE identifier, as determined based on the UE authentication token, to the UE identifier provided (at 106) in the request from UE 101, in order to verify that UE 101 making the request is the same UE that has been authenticated by network 103. In this manner, different UEs may not share the same UE authentication token, thus enhancing the security of a user of UE 101.

In some embodiments, the session token may also include and/or may be based on an identifier of UE 101. In some embodiments, the UE identifier(s) included in the session token may be the same UE identifier(s) as included in the UE authentication token. In some embodiments, the UE identifier(s) included in the session token may be different from the identifier(s) included in the UE authentication token. For example, in some embodiments, the UE identifier included in the session token may include an MDN of UE 101, and the identifier included in the session token may include a user name associated with UE 101 and the particular application (e.g., where service provider system 105 maintains information associated with user names, based on which service provider system 105 provides services).

Authentication system 107 may provide (at 114) the session token, associated with UE 101 and the particular application, to UE 101 and/or to service provider system 105. For example, authentication system 107 may use an identifier, URL, redirect address, etc. of service provider system 105 to provide the session token to service provider system 105. Additionally, or alternatively, authentication system 107 may provide the session token to UE 101, which may forward the session token to service provider system 105. Based on receiving the session token, service provider system 105 may identify that UE 101 and/or a user of UE 101 have been authenticated. For example, as discussed above, since the session token is generated by authentication system 107 based on a determination by authentication system 107 that UE 101 has been authenticated by network 103 (e.g., based on the UE authentication token), service provider system 105 may determine that UE 101 is an authenticated UE as opposed to a different UE that has not been authenticated by network 103 (e.g., in situations where a malicious user may be attempting to log in with user credentials associated with the user, from a device other than UE 101 that is in possession the user). Service provider system 105 may additionally verify a signature of authentication system 107 in the session token, thus indicating that the authentication of UE 101 and/or the user has been performed, verified, etc. by authentication system 107 as opposed to some other, potentially untrusted entity. Based on determining that UE 101 and/or the user have been authenticated (e.g., based on receiving the signed session token), service provider system 105 may proceed to communicate (at 116) with UE 101 via the particular application.

Figure 2:
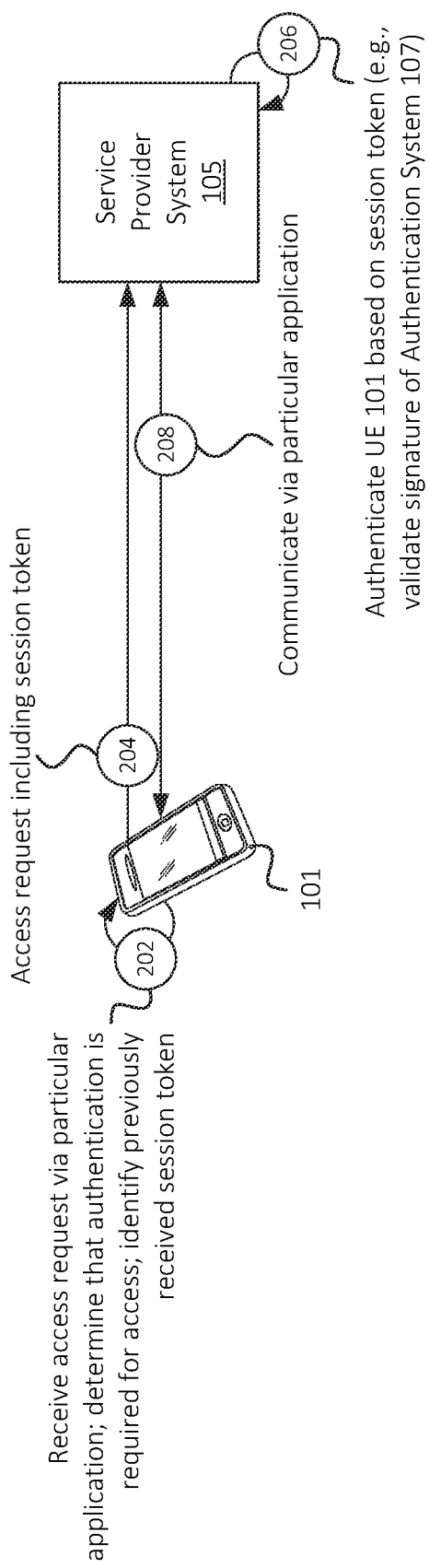

As shown in FIG. 2, for subsequent access requests associated with the same application, the repeated authentication (e.g., another instance of operation 110) of the user of UE 101 may not be required, as the session token may be used in lieu of such operations. For example, as shown, UE 101 may receive (at 202) another access request via the particular application (e.g., the same particular application as discussed above with respect to FIG. 1). In this example, UE 101 and/or the particular application may identify the previously received session token associated with UE 101 and the particular application. For example, UE 101 and/or the particular application may identify that an application identifier, included in or otherwise ascertainable based on the session token, matches an application identifier associated with the particular application.

UE 101 may request (at 204), access to services provided by service provider system 105. In some embodiments, the request may include the session token. Additionally, or alternatively, in some embodiments, the request may not include the session token, and service provider system 105 may identify the previously received session token based on an identifier of UE 101 and/or based on an identifier of the user of UE 101. Service provider system 105 may authenticate (at 206) UE 101 and/or the user based on the session token, which may include validating the signature of the session token (e.g., validating that the token originated from and/or was otherwise signed by authentication system 107). Service provider system 105 may proceed to communicate (at 208) with UE 101 via the particular application, as UE 101 and/or the user have been authenticated based on the session token. As such, the repeating of an authentication procedure (e.g., using two-factor authentication to authenticate UE 101 and/or using a user name, password, biometrics, etc. to authenticate the user) may not be necessary, thus enhancing and streamlining the user experience.

Some embodiments may utilize session tokens on an application group basis, thus allowing for a session token granted on behalf of one application to be used for one or more other applications in the same group, thus providing for a cross-application authentication of UE 101 and/or the user of UE 101. For example, a particular group of applications may be associated with, provided by, developed by, offered by, etc. the same entity or set of entities. Such entities may, for example, implement, embed, utilize, etc. one or more APIs associated with authentication system 107, such that multiple applications of the same group may use the same group identifier when communicating with authentication system 107. In this manner, the applications associated with the same group may provide a seamless cross-application authentication experience for a user, while maintaining the security of the user (e.g., by verifying that such seamless cross-application authentication experience is provided via a single UE 101).

Figure 3:
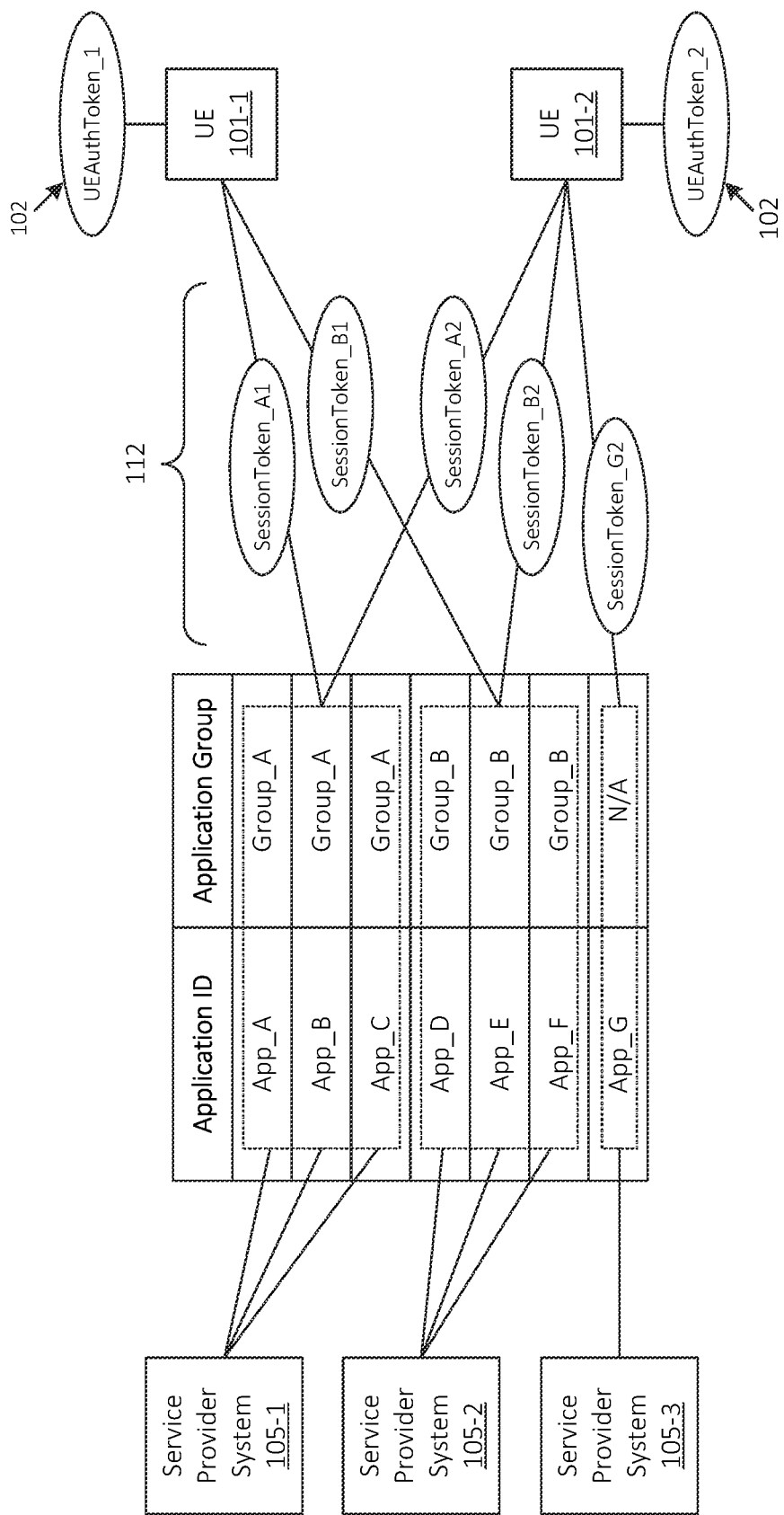
FIG. 3 illustrates an example association of particular UEs with different session tokens that are associated with different application groups, in accordance with some embodiments.

In some embodiments, as shown in FIG. 3, different service provider systems 105 may be associated with different application groups. For example, service provider system 105-1 may be associated with a first application group ("Group_A"), which includes example applications "App_A," "App_B," and "App_C." Service provider system 105-2 may be associated with a second application group ("Group_B"), which includes example applications "App_D," "App_E," and "App_F." Further, service provider system 105-3 may be associated with example application "App_G," which may not be associated with an application group. That is, in some implementations, a particular application need not be associated with an application group in order to utilize the authentication techniques described above (e.g., with respect to session tokens, UE authentication tokens, etc.).

While shown in FIG. 3 as each application group being associated with a particular respective service provider system 105, in practice, different applications of the same application group may be associated with different service provider systems 105. In some embodiments, each application group may be associated with a particular entity or set of entities that provide, develop, etc. As discussed below, the association of a particular application with a particular application group may include configuring such application to use a group identifier, associated with the particular application group, when communicating with authentication system 107, such as when requesting authentication via an associated service provider system 105.

A first UE 101-1 may be associated with a first UE authentication token ("UEAuthToken_1") and a first UE 101-2 may be associated with a second UE authentication token ("UEAuthToken_2"), which may each be provided (at 102) by network 103 and/or some other suitable device or system. Additionally, as discussed in further detail below with respect to FIGS. 3 and 4, based on communicating with authentication system 107, UEs 101-1 and 101-2 may be associated with respective session tokens that are each associated with a particular application and/or application group. Such tokens may be generated (e.g., at 112) by authentication system 107 (e.g., based on respective UE authentication tokens and based on application and/or application group identifiers provided by UEs 101-1 and 101-2 when communicating with authentication system 107).

For example, UE 101-1 may be associated with a first session token ("SessionToken_A1") that is associated with applications of Group_A, and a second session token ("SessionToken_B1") that is associated with applications of Group_B. UE 101-2 may be associated with a third authentication token ("SessionToken_A2") that is associated with applications of Group_A, a fourth session token ("SessionToken_B2") that is associated with applications of Group_B, and a fourth session token ("SessionToken_G2") that is associated with App_G.

Authentication system 107 may generate SessionToken_B1 the first time that UE 101-1 requests access or otherwise participates in an authentication procedure associated with an application of Group_B, and the same SessionToken_B1 may be used for subsequent access requests associated with the same or other applications of Group_B. For example, UE 101-1 may be prompted (e.g., by authentication system 107 or some other device or system) to provide authentication credentials such as a user name and password, a token signifying biometric authentication at UE 101-1, and/or other suitable authentication credentials in order to generate SessionToken_B1, but such authentication credentials may not be needed once SessionToken_B1 has been generated.

Figure 4:
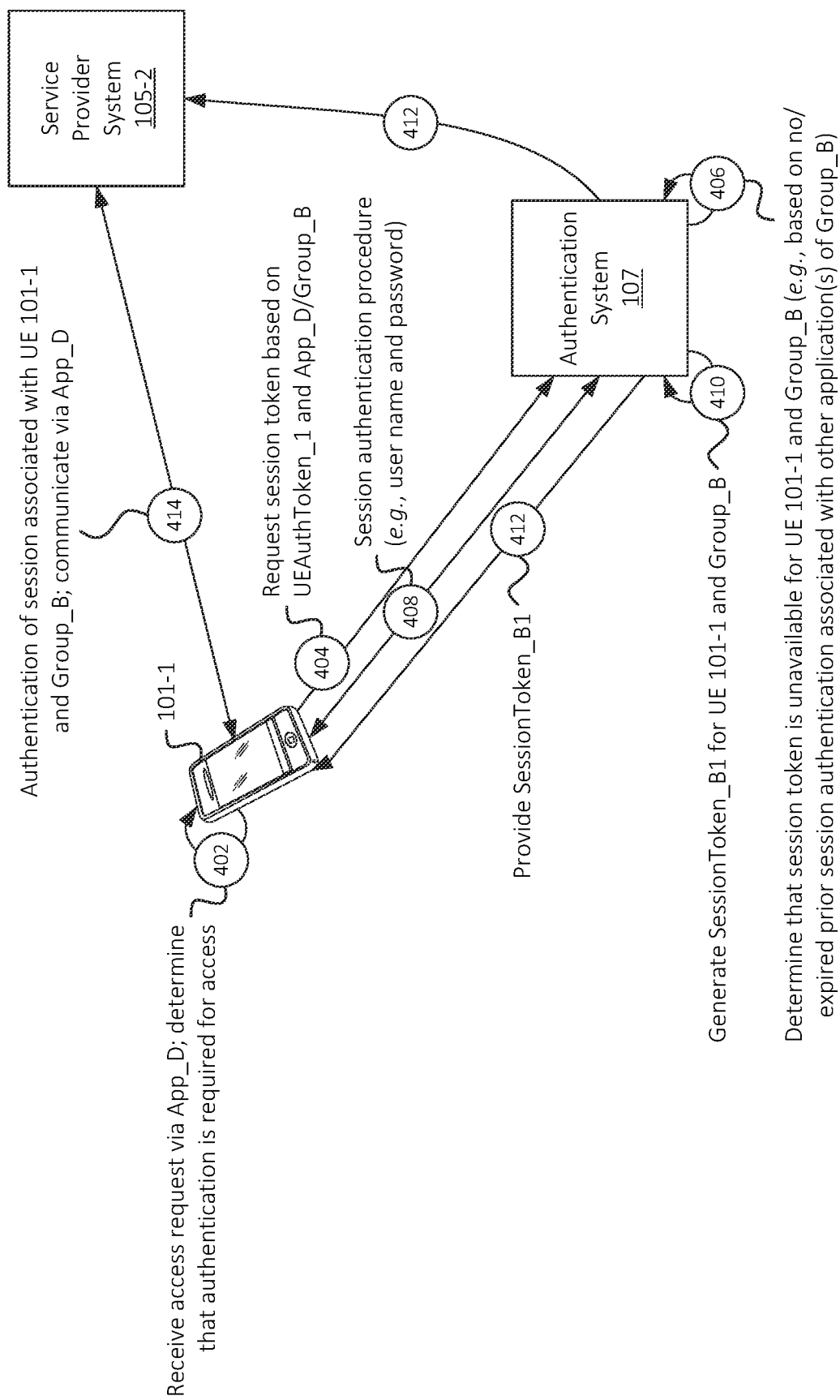
FIGS. 4 and 5 illustrate an example of generating and/or using a session token to authenticate a UE across multiple applications, in accordance with some embodiments.

For example, as shown in FIG. 4, UE 101-1 may receive (at 402) an access request via App_D, such as based on a user selection via App_D, as similarly discussed above. UE 101-1 may request (at 404) a session token from authentication system 107. The request may include or may otherwise indicate a UE authentication token associated with UE 101-1 (e.g., UEAuthToken_1, which may have previously been provided by network 103 based on a suitable authentication technique whereby network 103 validates and signs the identity of UE 101-1). The request may also include an identifier of Group_B, with which App_D is associated. For example, as discussed above, UE 101 and/or App_D may have been configured to provide an identifier of Group_B, with which App_D is associated, when requesting authentication via App_D. In some embodiments, UE 101-1 may provide an identifier of App_D, an identifier of service provider system 105-2, and/or some other indication based on which authentication system 107 may subsequently communicate with service provider system 105-2, with which App_D is associated (e.g., to indicate successful authentication of UE 101-1, as discussed below).

In this example, authentication system 107 may determine (at 406) that a session token is unavailable for UE 101-1 and Group_B, which may be based on such token not having been previously generated, or based on the expiration or revocation of a previously generated token for UE 101-1 accessing applications of Group_B. Based on determining (at 406) that a session token is unavailable for UE 101-1 and Group_B, authentication system 107 may initiate (at 408) an authentication procedure whereby UE 101-1 is authenticated according to one or more authentication procedures via which service provider system 105-2 is able to authenticate UE 101-1 and/or a user of UE 101-1, as similarly discussed above. Once UE 101-1 and/or the user of UE 101-1 have been authenticated (at 408) according to such procedures, authentication system 107 may generate (at 410) a session token associated with UE 101-1 and Group_B (e.g., SessionToken_B1), and may provide (at 412) such session token to UE 101-1 and/or service provider system 105-2. As SessionToken_B1 signifies that UE 101-1 has been authenticated by network 103 and further that UE 101-1 and/or the user of UE 101-1 have been authenticated according to one or more procedures implemented, trusted, etc. by service provider system 105-2, service provider system 105-2 may determine that UE 101-1 and/or the user of UE 101-1 have been authenticated, and may proceed to communicate (at 414) with UE 101-1 via App_D, with which Group_B is associated.

Figure 5:
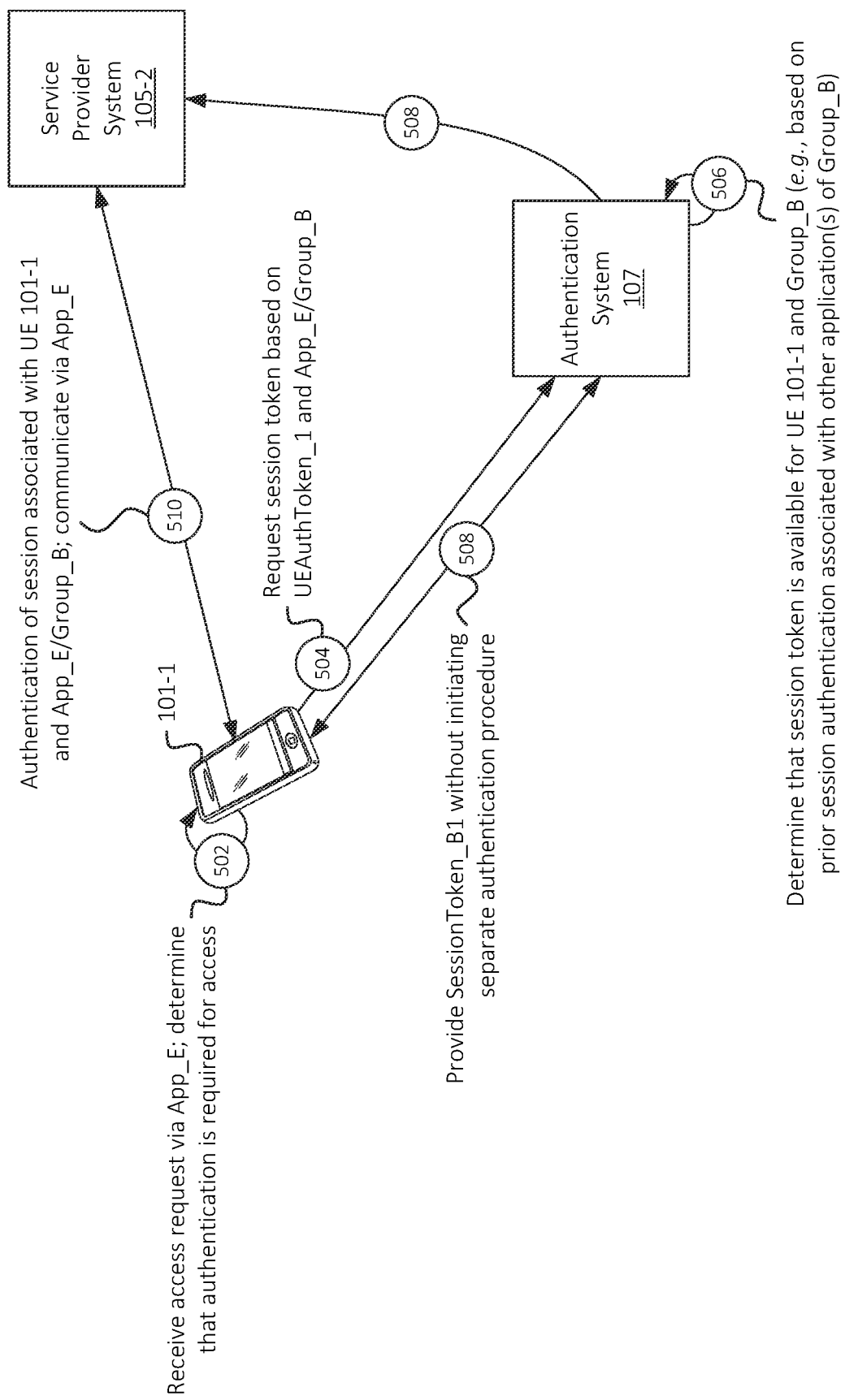

As noted above, this session token may be used for a seamless cross-application authentication procedure associated with another application of the same group. For example, as shown in FIG. 5, UE 101-1 may receive (at 502) an access request via App_E. Continuing with the examples above, App_E may also be in Group_B (e.g., may have been provided by the same entity as App_D, may be associated with the same application service provider system 105-2 as App_D, etc.). Based on the received access request via App_E, UE 101-1 may request (at 504) a session token associated with Group_B. The request may include or may otherwise indicate a UE authentication token associated with UE 101-1 (e.g., UEAuthToken_1). The request may also include an identifier of Group_B, with which App_# is associated. For example, as discussed above, UE 101 and/or App_E may have been configured to provide an identifier of Group_B, with which App_E is associated, when requesting authentication via App_E. In some embodiments, UE 101-1 may provide an identifier of App_E, an identifier of service provider system 105-2, and/or some other indication based on which authentication system 107 may subsequently communicate with service provider system 105-2.

Since the session token for UE 101-1 and Group_B (e.g., SessionToken_B1) was previously generated (e.g., at 406), authentication system 107 may determine (at 506) that such session token is available, and may provide (at 508) the session token associated with UE 101-1 and Group_B to UE 101-1 and/or service provider system 105-2, without initiating further authentication procedures which would potentially include requesting information or actions from a user of UE 101-1. For example, authentication system 107 may provide (at 508) SessionToken_B1 without prompting UE 101-1 or a user of UE 101-1 to provide a user name and password, to participate in a biometric authentication procedure, and/or to otherwise perform any actions related to authenticating UE 101-1 or the user. Based on receiving (at 508) the session token, service provider system 105-2 may determine that UE 101-1 and the user have been authenticated, and may proceed to communicate (at 510) with UE 101-1-via App_E.

Figure 6:
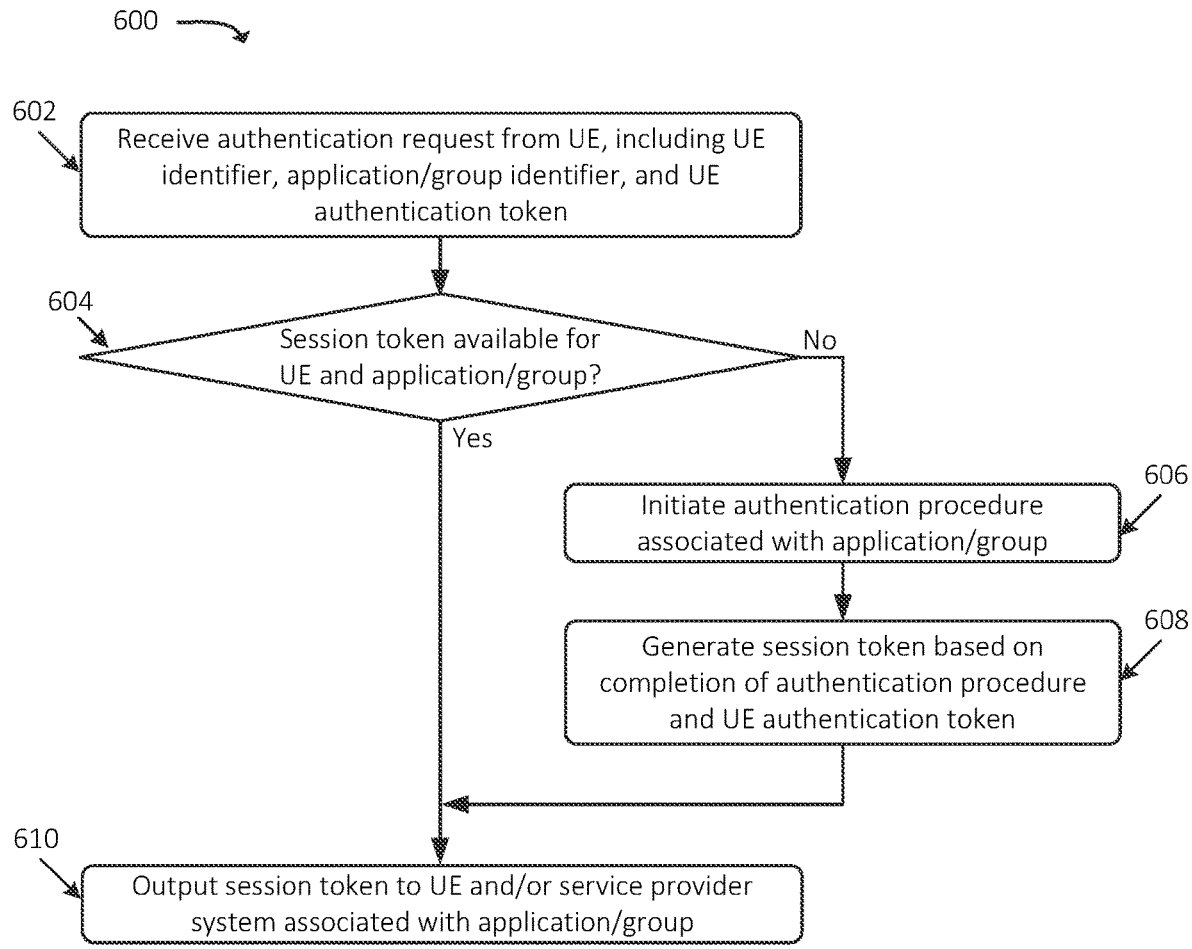
FIG. 6 illustrates an example process for generating and/or using a session token to authenticate a UE across multiple applications, in accordance with some embodiments.

FIG. 6 illustrates an example process 600 for generating and/or using a session token to authenticate a particular UE 101 across multiple applications. In some embodiments, some or all of process 600 may be performed by authentication system 107. In some embodiments, one or more other devices may perform some or all of process 600 in concert with, and/or in lieu of, authentication system 107.

As shown, process 600 may include receiving (at 602) an authentication request from a particular UE 101. For example, as discussed above, authentication system 107 may receive such request based on a request sent via a particular application or API associated with UE 101. The request may be received based on a user interaction with UE 101. The request may include an identifier of UE 101, such as an MDN, an IMEI value, an IMSI value, an IP address, etc. The request may include an identifier of the particular application and/or a group with which the particular application is associated. In some embodiments, the request may include a token (e.g., a UE authentication token) validating the provided identifier, and/or from which such identifier may be extracted, computed, decrypted, or otherwise determined. Such token (e.g., the UE authentication token) may have been generated, provided, signed, etc. by network 103, which may include a wireless network. In some embodiments, such token may have been generated, provided, signed, etc. by some other suitable device or system that validates the identity of UE 101. In some embodiments, the request may include an identifier, a URL, an IP address, etc. of service provider system 105 with which the application or group is associated.

Process 600 may further include determining (at 604) whether a session token is available for UE 101 and the particular indicated application or group. If such session token is not available (at 604—NO), then process 600 may additionally include initiating (at 606) an authentication procedure associated with the application or group. For example, authentication system 107 may output an indication to UE 101, service provider system 105, and/or some other device or system (e.g., an SSO system or other suitable authentication or verification system) that authentication of UE 101 and/or a user of UE 101 is needed. In some embodiments, such authentication procedure may include requesting one or more inputs, user interactions, etc. at UE 101, such as requesting a user name and password, requesting the performance of a UE-based biometric authentication technique (e.g., fingerprint, facial scan, etc.), requesting that a link or URL be clicked via a graphical user interface ("GUI") of UE 101, etc.

Process 600 may also include generating (at 608) a session token based on successful completion of the authentication procedure. In some embodiments, the session token may further be generated based on the UE authentication token. For example, service provider system 105 may validate a signature of the UE authentication token, where such validation may indicate that network 103 or some other suitable source has authenticated the identify of UE 101 and has accordingly provided the UE authentication token to UE 101. In some embodiments, generating the session token may include providing a signature of service provider system 105, such as by using a private key of a public-private key pair, where the signature of service provider system 105 may be verified using the public key of the public-private key pair. In some embodiments, the session token may include an identifier of UE 101, which may be extracted from the UE authentication token provided by UE 101, and/or which may be separately provided by UE 101 as part of the authentication request (at 602).

Process 600 may further include outputting (at 610) the session token to UE 101 and/or to service provider system 105 with which the application or group is associated. For example, service provider system 105 may provide the session token to UE 101, which may provide the session token to service provider system 105. Additionally, or alternatively, the request may specify one or more identifiers of service provider system 105, such as a URL, an IP address, etc., based on which authentication system 107 may provide the session token to service provider system 105. Service provider system 105 may validate the session token, such as by verifying that a signature of the session token matches a signature associated with service provider system 105. For example, as discussed above, service provider system 105 may utilize a public key to verify that the session token was signed using an associated private key associated with service provider system 105. In some embodiments, service provider system 105 may verify that a UE identifier, indicated in the session token, matches a UE identifier associated with UE 101. In this manner, service provider system 105 may be able to verify that the session token is associated with UE 101, as opposed to some other UE. Service provider system 105 may also be able to verify that UE 101 has been authenticated by network 103, which may prevent spoofing of UE 101 and/or other types of attacks in which the identity of UE 101 may be compromised. Further, service provider system 105 may be able to verify that an authentication procedure has been performed with respect to UE 101 and/or a user of UE 101, by virtue of generation and/or providing of the session token.

As discussed above, other applications may be able to perform a seamless authentication procedure based on the session token, which may include forgoing operations 606 and 608, once the session token has been generated. For example, for a subsequent authentication request from the same application and/or a different application in the same group (e.g., where such subsequent authentication request may include the same group identifier), service provider system 105 may determine (at 604—YES) that the session token for UE 101 and the particular group is available, and may output (at 610) the session token based on determining that such session token is available. For example, service provider system 105 may compare one or more UE identifiers, indicated in the session token, with one or more UE identifiers provided by UE 101 in the subsequent request. Further, service provider system 105 may compare a group identifier, included in the session token, with the group identifier provided by UE 101 in the subsequent request, in order to determine that the previously generated session token is associated with UE 101.

Figure 7:
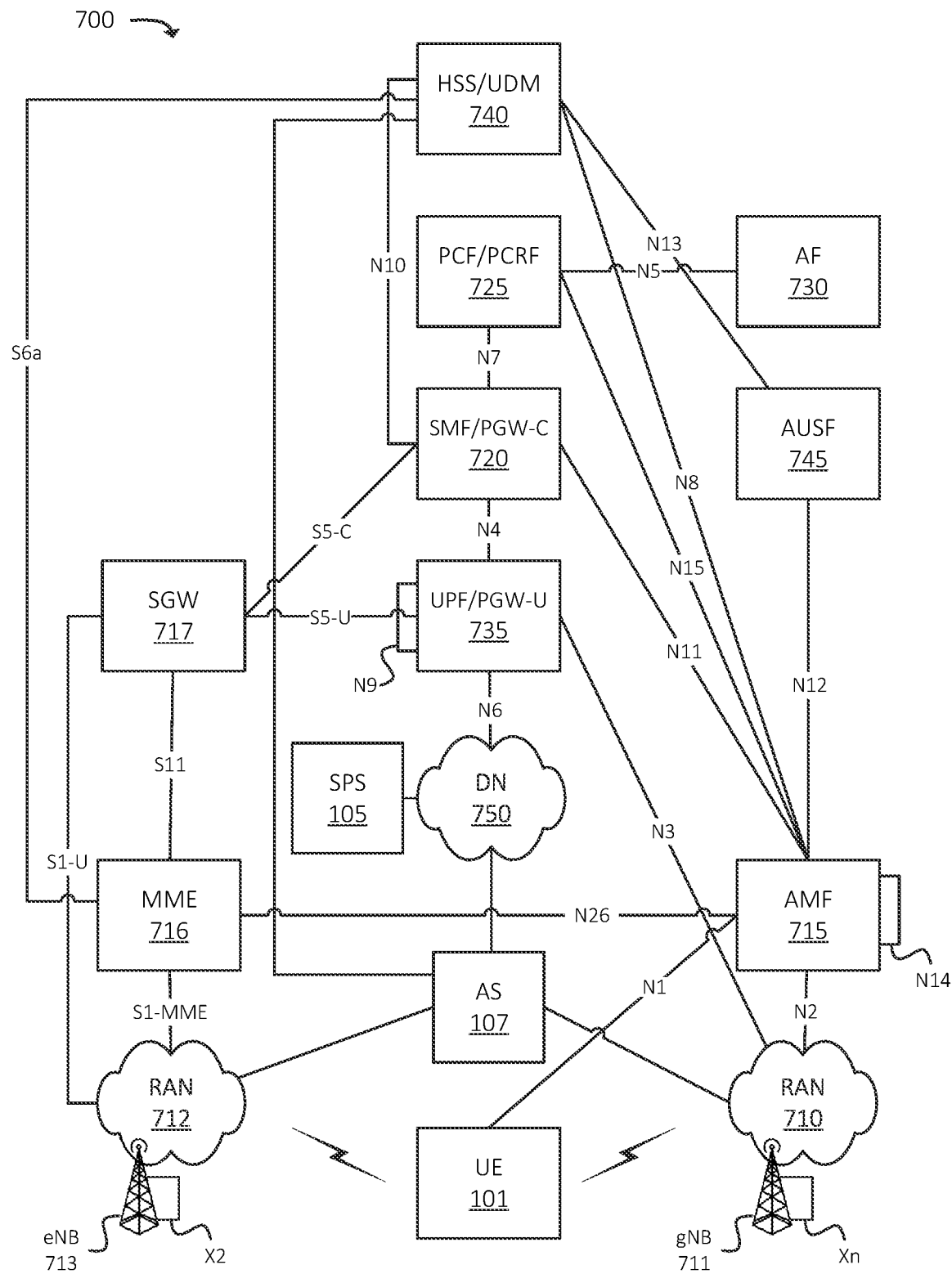
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 101, RAN 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Unified Data Management ("UDM")/Home Subscriber Server ("HSS") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as service provider system 105 and/or authentication system 107.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF/PGW-C 720, PCF/PCRF 725, UPF/PGW-U 735, UDM/HSS 740, and/or AUSF 745, while another slice may include a second instance of SMF/PGW-C 720, PCF/PCRF 725, UPF/PGW-U 735, UDM/HSS 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 101 may include a computation and communication device, such as a wireless mobile communication device that is capable of communicating with RAN 710, RAN 712, and/or DN 750. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 101 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 101 may communicate with one or more other elements of environment 700. UE 101 may communicate with RAN 710 via an air interface (e.g., as provided by gNB 711). For instance, RAN 710 may receive traffic (e.g., voice call traffic, data traffic, messaging traffic, signaling traffic, etc.) from UE 101 via the air interface, and may communicate the traffic to UPF/PGW-U 735, and/or one or more other devices or networks. Similarly, RAN 710 may receive traffic intended for UE 101 (e.g., from UPF/PGW-U 735, AMF 715, and/or one or more other devices or networks) and may communicate the traffic to UE 101 via the air interface.

RAN 712 may be, or may include, a LTE RAN that includes one or more base stations (e.g., one or more eNBs 713), via which UE 101 may communicate with one or more other elements of environment 700. UE 101 may communicate with RAN 712 via an air interface (e.g., as provided by eNB 713). For instance, RAN 710 may receive traffic (e.g., voice call traffic, data traffic, messaging traffic, signaling traffic, etc.) from UE 101 via the air interface, and may communicate the traffic to UPF/PGW-U 735, and/or one or more other devices or networks. Similarly, RAN 710 may receive traffic intended for UE 101 (e.g., from UPF/PGW-U 735, SGW 717, and/or one or more other devices or networks) and may communicate the traffic to UE 101 via the air interface.

AMF 715 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 101. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 101, from DN 750, and may forward the user plane data toward UE 101 (e.g., via RAN 710, SMF/PGW-C 720, and/or one or more other devices). In some embodiments, multiple UPFs 735 may be deployed (e.g., in different geographical locations), and the delivery of content to UE 101 may be coordinated via the N9 interface (e.g., as denoted in FIG. 7 by the line marked "N9" originating and terminating at UPF/PGW-U 735). Similarly, UPF/PGW-U 735 may receive traffic from UE 101 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. AUSF 745 and/or UDM/HSS 740 may perform authentication, authorization, and/or accounting operations associated with the subscriber and/or a communication session with UE 101.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 101 may communicate, through DN 750, with data servers, other UEs 101, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 101 may communicate.

Figure 8:
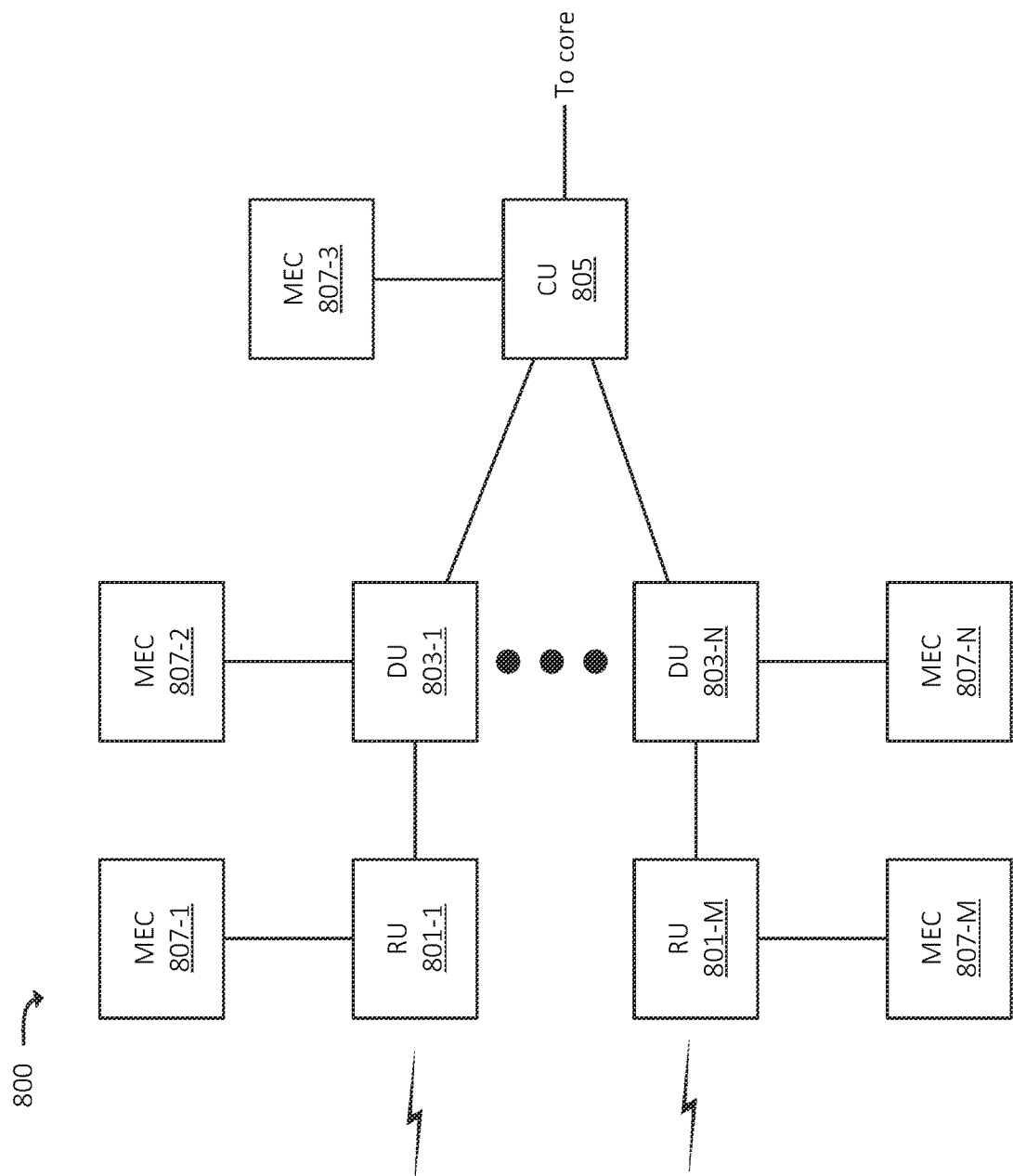
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 101 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 101, and may determine which DU(s) 803 should receive the downlink traffic. DU 803 may include one or more devices that transmit traffic between a core network (e.g., via CU 805) and UE 101 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 101.

RU 801 may include hardware circuitry (e.g., one or more RF transceivers, antennas, radios, and/or other suitable hardware) to communicate wirelessly (e.g., via an RF interface) with one or more UEs 101, one or more other DUs 803 (e.g., via RUs 801 associated with DUs 803), and/or any other suitable type of device. In the uplink direction, RU 801 may receive traffic from UE 101 and/or another DU 803 via the RF interface and may provide the traffic to DU 803. In the downlink direction, RU 801 may receive traffic from DU 803, and may provide the traffic to UE 101 and/or another DU 803.

RUs 801 may, in some embodiments, be communicatively coupled to one or more MECs 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 101, via a respective RU 801.

For example, RU 801-1 may route some traffic, from UE 101, to MEC 807-1 instead of to a core network (e.g., via DU 803 and CU 805). MEC 807-1 may process the traffic, perform one or more computations based on the received traffic, and may provide traffic to UE 101 via RU 801-1. In this manner, ultra-low latency services may be provided to UE 101, as traffic does not need to traverse DU 803, CU 805, and an intervening backhaul network between DU network 800 and the core network. In some embodiments, MEC 807 may include, and/or may implement, some or all of the functionality described above with respect to service provider system 105, authentication system 107, UPF 735, and/or one or more other devices, systems, VNFs, CNFs, etc.

Figure 9:
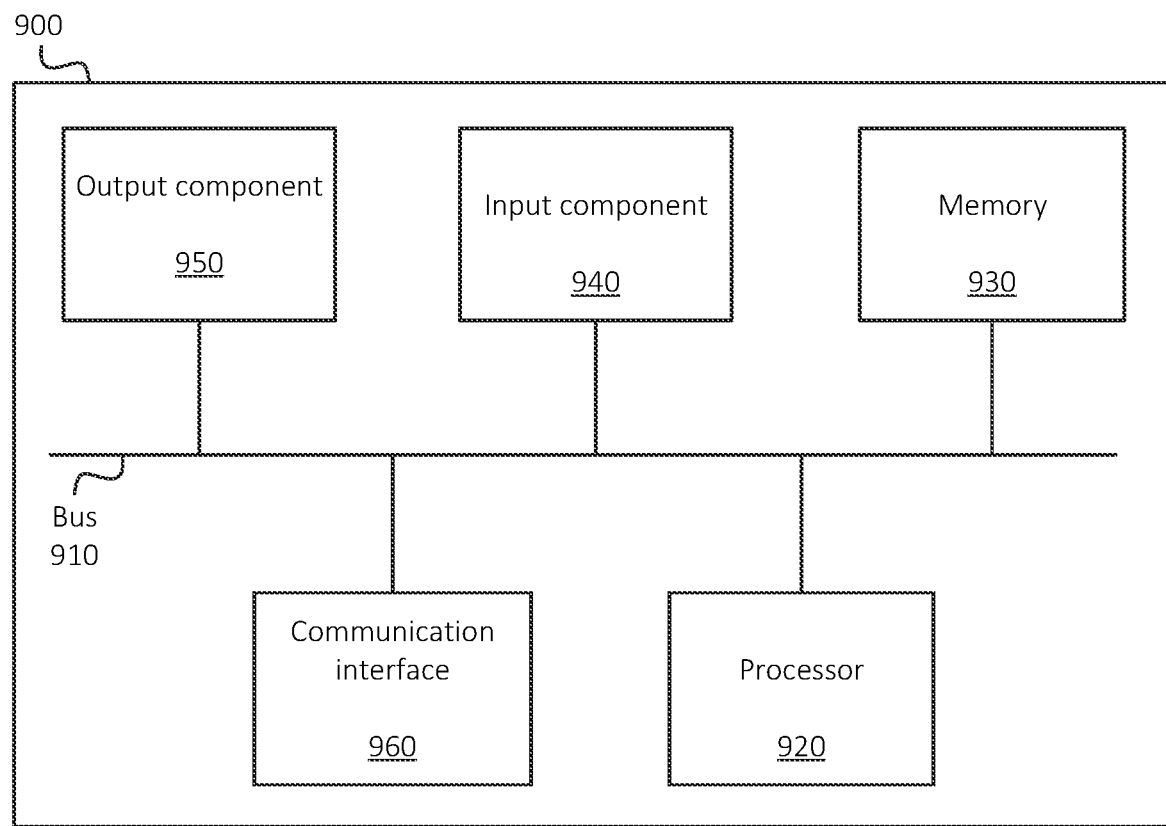
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a first authentication request from a User Equipment ("UE"), wherein the first authentication request is associated with a first application and includes the particular application group identifier, wherein the particular application group identifier is associated with a plurality of applications including the first application and a second application;
initiate, based on the first authentication request, an authentication procedure that includes receiving input from the UE;
generate a token that indicates that the authentication procedure has been completed with respect to the UE and the particular application group identifier;

output the generated token to at least one of the UE or a first service provider system associated with the first application, wherein the first service provider system authenticates the UE based on the generated token;

receive a second authentication request from the UE, wherein the second authentication request is associated with the second application and includes the particular application group identifier;

identify that the particular application group identifier included in the second authentication request is the same particular application group identifier included in the first authentication request; and output, based on the identifying and without initiating the authentication procedure that includes receiving input from the UE, the generated token to at least one of the UE or a second service provider system associated with the second application, wherein the second service provider system authenticates the UE based on the generated token.

2. The device of claim 1, wherein the first and second service provider systems are the same service provider system.

3. The device of claim 1, wherein the token is a first token, wherein the first authentication request further includes a second token, wherein generating the first token is further based on the second token.

4. The device of claim 3, wherein the second token includes a signature associated with a wireless network.

5. The device of claim 3, wherein the second token indicates validity of an identifier of the UE.

6. The device of claim 1, wherein the first application and the second application implement a particular application programming interface ("API") via which the particular application group identifier is provided in the first and second authentication requests.

7. The device of claim 1, wherein the UE is a first UE and wherein the token is a first token, wherein the one or more processors are further configured to:
receive, after generating the first token, a third authentication request from a second UE, wherein the third authentication request is associated with the first application and includes the particular application group identifier;
initiate, based on the third authentication request, an authentication procedure that includes receiving input from the second UE; and
generate a second token that indicates that the authentication procedure has been completed with respect to the second UE and the particular application group identifier.

8. A non-transitory computer-readable medium, storing a plurality of processor-executable instructions to:
receive a first authentication request from a User Equipment ("UE"), wherein the first authentication request is associated with a first application and includes the particular application group identifier, wherein the particular application group identifier is associated with a plurality of applications including the first application and a second application;
initiate, based on the first authentication request, an authentication procedure that includes receiving input from the UE;
generate a token that indicates that the authentication procedure has been completed with respect to the UE and the particular application group identifier;

output the generated token to at least one of the UE or a first service provider system associated with the first application, wherein the first service provider system authenticates the UE based on the generated token;

receive a second authentication request from the UE, wherein the second authentication request is associated with the second application and includes the particular application group identifier;

identify that the particular application group identifier included in the second authentication request is the same particular application group identifier included in the first authentication request; and output, based on the identifying and without initiating the authentication procedure that includes receiving input from the UE, the generated token to at least one of the UE or a second service provider system associated with the second application, wherein the second service provider system authenticates the UE based on the generated token.

9. The non-transitory computer-readable medium of claim 8, wherein the first and second service provider systems are the same service provider system.

10. The non-transitory computer-readable medium of claim 8, wherein the token is a first token, wherein the first authentication request further includes a second token, wherein generating the first token is further based on the second token.

11. The non-transitory computer-readable medium of claim 10, wherein the second token includes a signature associated with a wireless network.

12. The non-transitory computer-readable medium of claim 10, wherein the second token indicates validity of an identifier of the UE.

13. The non-transitory computer-readable medium of claim 8, wherein the first application and the second application implement a particular application programming interface ("API") via which the particular application group identifier is provided in the first and second authentication requests.

14. The non-transitory computer-readable medium of claim 8, wherein the UE is a first UE and wherein the token is a first token, wherein the plurality of processor-executable instructions further include processor-executable instructions to:
receive, after generating the first token, a third authentication request from a second UE, wherein the third authentication request is associated with the first application and includes the particular application group identifier;
initiate, based on the third authentication request, an authentication procedure that includes receiving input from the second UE; and
generate a second token that indicates that the authentication procedure has been completed with respect to the second UE and the particular application group identifier.

15. A method, comprising:
receiving a first authentication request from a User Equipment ("UE"), wherein the first authentication request is associated with a first application and includes the particular application group identifier, wherein the particular application group identifier is associated with a plurality of applications including the first application and a second application;
initiating, based on the first authentication request, an authentication procedure that includes receiving input from the UE;

generating a token that indicates that the authentication procedure has been completed with respect to the UE and the particular application group identifier;

outputting the generated token to at least one of the UE or a first service provider system associated with the first application, wherein the first service provider system authenticates the UE based on the generated token;

receiving a second authentication request from the UE, wherein the second authentication request is associated with the second application and includes the particular application group identifier;

identifying that the particular application group identifier included in the second authentication request is the same particular application group identifier included in the first authentication request; and outputting, based on the identifying and without initiating the authentication procedure that includes receiving input from the UE, the generated token to at least one of the UE or a second service provider system associated with the second application, wherein the second service provider system authenticates the UE based on the generated token.

16. The method of claim 15, wherein the token is a first token, wherein the first authentication request further includes a second token, wherein generating the first token is further based on the second token.

17. The method of claim 16, wherein the second token includes a signature associated with a wireless network.

18. The method of claim 16, wherein the second token indicates validity of an identifier of the UE.

19. The method of claim 15, wherein the first application and the second application implement a particular application programming interface ("API") via which the particular application group identifier is provided in the first and second authentication requests.

20. The method of claim 15, wherein the UE is a first UE and wherein the token is a first token, the method further comprising:

receiving, after generating the first token, a third authentication request from a second UE, wherein the third authentication request is associated with the first application and includes the particular application group identifier;

initiating, based on the third authentication request, an authentication procedure that includes receiving input from the second UE; and generating a second token that indicates that the authentication procedure has been completed with respect to the second UE and the particular application group identifier.

* * * * *